United States Patent
Pebley et al.

(10) Patent No.: US 9,266,520 B2
(45) Date of Patent: Feb. 23, 2016

(54) DYNAMIC TUNING OF ENGINE AUTO STOP CRITERIA

(75) Inventors: Kirk Pebley, Novi, MI (US); Mark Douglas Malone, Canton, MI (US); David Celinske, Wolverine Lake, MI (US); Scott R. Caudill, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1139 days.

(21) Appl. No.: 13/294,311

(22) Filed: Nov. 11, 2011

(65) Prior Publication Data

US 2013/0124066 A1 May 16, 2013

(51) Int. Cl.
| | |
|---|---|
| *G06F 19/00* | (2011.01) |
| *B60W 10/06* | (2006.01) |
| *B60W 10/26* | (2006.01) |
| *F02D 17/04* | (2006.01) |
| *F02D 29/02* | (2006.01) |
| *B60W 30/18* | (2012.01) |
| *F02N 11/08* | (2006.01) |
| *B60W 50/00* | (2006.01) |

(52) U.S. Cl.
CPC .............. *B60W 10/06* (2013.01); *B60W 10/26* (2013.01); *B60W 30/18018* (2013.01); *F02D 17/04* (2013.01); *F02D 29/02* (2013.01); *B60W 2050/0089* (2013.01); *B60W 2530/14* (2013.01); *F02N 11/0818* (2013.01); *F02N 2200/061* (2013.01); *F02N 2200/105* (2013.01); *F02N 2200/14* (2013.01); *F02N 2300/2004* (2013.01); *F02N 2300/2006* (2013.01)

(58) Field of Classification Search
CPC . Y02T 10/48; F02N 11/0814; F02N 11/0818; F02D 41/042
USPC ............... 701/102, 112; 123/179.4; 290/40 C
See application file for complete search history.

(56) References Cited

U.S. PATENT DOCUMENTS

| | | | |
|---|---|---|---|
| 6,504,259 B1 * | 1/2003 | Kuroda et al. ............... | 290/40 C |
| 2004/0149246 A1 * | 8/2004 | Itoh et al. ................... | 123/179.4 |
| 2005/0061563 A1 | 3/2005 | Syed et al. | |
| 2006/0030997 A1 * | 2/2006 | Ozeki et al. ................... | 701/112 |
| 2011/0046864 A1 * | 2/2011 | Kamiya ........................ | 701/102 |
| 2011/0066359 A1 * | 3/2011 | Lin et al. ....................... | 701/112 |
| 2011/0180031 A1 * | 7/2011 | Hamane ..................... | 123/179.4 |

FOREIGN PATENT DOCUMENTS

| | | |
|---|---|---|
| EP | 1564403 A2 | 8/2005 |
| JP | 2006336628 A | 12/2006 |
| WO | 2010018900 A1 | 2/2010 |

\* cited by examiner

*Primary Examiner* — Mahmoud Gimie
*Assistant Examiner* — David Hamaoui
(74) *Attorney, Agent, or Firm* — David B. Kelley; Brooks Kushman P.C.

(57) ABSTRACT

The criteria used to determine whether to initiate an auto stop of an engine may be altered based on a number of previous auto stops of the engine, a total auto stop off time of the engine, or a total throughput of a battery. Altering the criteria may influence a frequency with which the engine is auto stopped.

14 Claims, 2 Drawing Sheets

DYNAMIC TUNING OF ENGINE AUTO STOP CRITERIA

TECHNICAL FIELD

This disclosure relates to processes, methods, algorithms and systems for encouraging and/or discouraging engine auto stops in micro-hybrid or other similarly arranged vehicles.

BACKGROUND

A micro-hybrid vehicle may automatically stop its internal combustion engine for a period of time during intervals of a drive cycle when vehicle speed approaches or is equal to zero. These engine auto stops may improve fuel economy by reducing engine idle time and thus fuel consumption for the drive cycle.

SUMMARY

Criteria used to determine whether to auto stop an engine may be changed to encourage or discourage engine auto stops.

A vehicle may include a battery, an engine, and at least one controller. The at least one controller may command the engine to auto stop in accordance with auto stop criteria and alter the auto stop criteria based on at least one of a number of previous auto stops of the engine, a total auto stop off time of the engine, and a total throughput of the battery to affect a frequency with which the engine is auto stopped. The at least one controller may alter the auto stop criteria, if the number of previous auto stops of the engine is less than an expected number of previous auto stops of the engine, if the total auto stop off time of the engine is less than an expected total auto stop off time of the engine, and/or if the total throughput of the battery is less than an expected total throughput of the battery, such that the frequency with which the engine is auto stopped increases. The at least one controller may alter the auto stop criteria, if the number of previous auto stops of the engine is greater than an expected number of previous auto stops of the engine, if the total auto stop off time of the engine is greater than an expected total auto stop off time of the engine, and/or if the total throughput of the battery is greater than an expected total throughput of the battery such that the frequency with which the engine is auto stopped decreases.

An engine of a vehicle may be controlled by tracking a number of auto stops of the engine for a drive cycle, commanding the engine to auto stop in accordance with auto stop criteria, and altering the auto stop criteria, if the number of auto stops is less than an expected number of auto stops for the drive cycle, such that a frequency with which the engine is auto stopped increases. The engine may be further controlled by altering the auto stop criteria, if the number of auto stops is greater than the expected number of auto stops, such that the frequency with which the engine is auto stopped decreases. Altering the auto stop criteria may include at least one of altering a battery voltage threshold value, altering a range of acceptable battery states of charge, and altering an electric current demand threshold value.

An engine of a vehicle may be controlled by tracking an auto stop off time of the engine for a drive cycle, commanding the engine to auto stop in accordance with auto stop criteria, and altering the auto stop criteria, if the auto stop off time is less than an expected auto stop off time for the drive cycle, such that a frequency with which the engine is auto stopped increases. The engine may be further controlled by altering the auto stop criteria, if the auto stop off time is greater than the expected auto stop off time, such that the frequency with which the engine is auto stopped decreases. Altering the auto stop criteria includes at least one of altering a battery voltage threshold value, altering a range of acceptable battery states of charge, and altering an electric current demand threshold value.

An engine of a vehicle may be controlled by tracking a throughput of a battery of the vehicle for a drive cycle, commanding the engine to auto stop in accordance with auto stop criteria, and altering the auto stop criteria, if the throughput of the battery is less than an expected throughput of the battery for the drive cycle, such that a frequency with which the engine is auto stopped increases. The engine may be further controlled by altering the auto stop criteria, if the throughput of the battery is greater than the expected throughput of the battery, such that the frequency with which the engine is auto stopped decreases. Altering the auto stop criteria includes at least one of altering a battery voltage threshold value, altering a range of acceptable battery states of charge, and altering an electric current demand threshold value.

Dynamically altering the criteria used to determine whether to initiate an auto stop of an engine may permit certain vehicles to experience an increase in fuel economy and/or may ensure that stop/start system durability expectations are maintained. The above advantages and other advantages and features associated with various embodiments of the present disclosure will be readily apparent from the following detailed description when taken in connection with the accompanying drawings.

DETAILED DESCRIPTION

Embodiments of the present disclosure are described herein; however, it is to be understood that the disclosed embodiments are merely examples and other embodiments may take various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, may be desired for particular applications or implementations.

Figure 1:
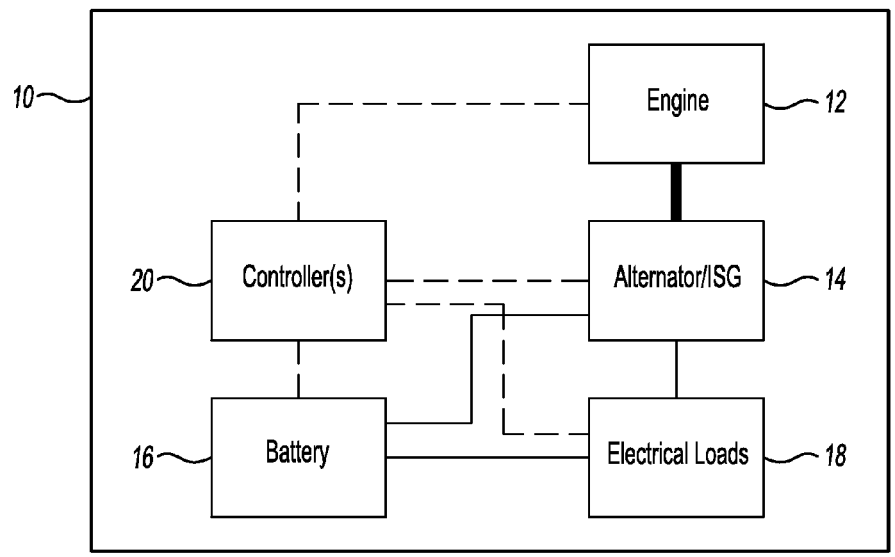
FIG. 1 is a block diagram of a micro-hybrid vehicle.

Referring to FIG. 1, a micro-hybrid vehicle 10 may include an engine 12, an alternator or integrated starter generator 14, a battery 16 (e.g., a 12 V battery), and electrical load subsystems 18 (e.g., electric power steering assist system, electric park brake system, HVAC blower system, heated windshield system, etc.) in communication with/under the control of one or more controllers 20 (as indicated by dashed line). The engine 12 is mechanically connected with the alternator or integrated starter generator 14 (as indicated by thick line) such that the engine 12 may drive the alternator or integrated starter generator 14 to generate electric current. The alternator or integrated starter generator 14 and battery 16 are electrically connected with each other and the electrical load subsystems 18 (as indicated by thin line). Hence, the alternator or integrated starter generator 14 may charge the battery 16; the electrical load subsystems 18 may consume electric current provided by the alternator or integrated starter generator 14 and/or battery 16. Other micro-hybrid or stop/start vehicle configurations, however, are also contemplated.

The controllers 20 may initiate an auto stop or auto start of the engine 12. As the vehicle 10 comes to a stop, for example, the controllers 20 may issue a command to begin the process to stop the engine 12. Stopping the engine 12 prevents the alternator or integrated starter generator 14 from providing electric current to the electrical load subsystems 18. The battery 16 may provide electric current to the electrical load subsystems 18 while the engine 12 is stopped.

As a brake pedal (not shown) is disengaged and/or an accelerator pedal (not shown) is engaged after an engine auto stop, the controllers 20 may issue a command to begin the process to start the engine 12, thus enabling the alternator or integrated starter generator 14 to provide electric current to the electrical load subsystems 18.

Figure 2:
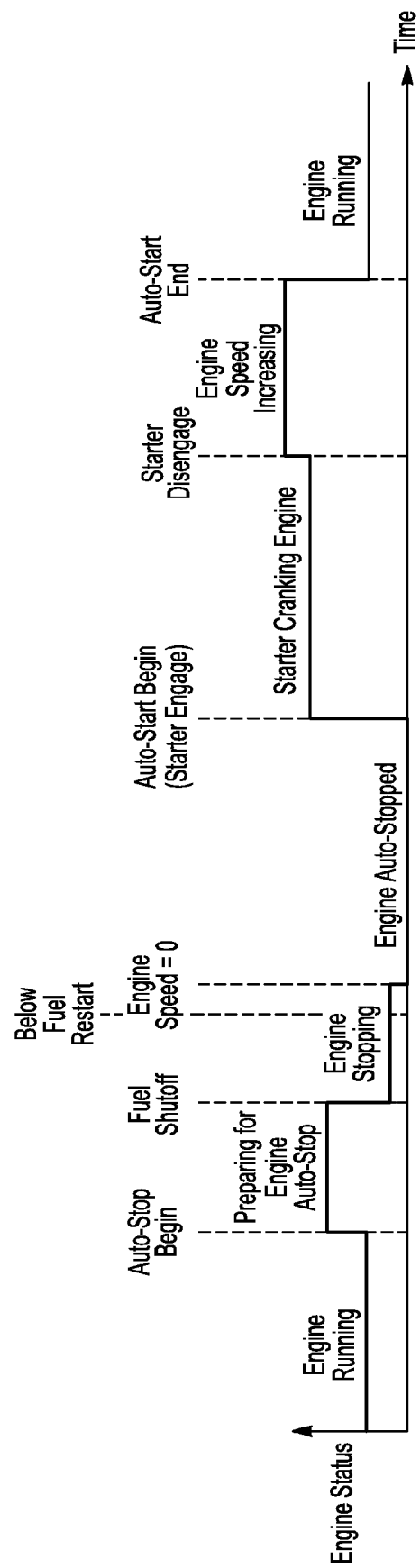
FIG. 2 is a plot of engine status versus time before, during and after an engine stop/start event.

Referring to FIG. 2, an engine auto stop event may include several stages. "Auto-stop begin" marks the beginning of the engine auto stop event. "Preparing for engine auto-stop" is the time period during which vehicle systems as well as the engine are prepared for the impending engine stop. If an auto stop inhibit condition is detected during this stage, the preparation for the impending engine stop is discontinued and the vehicle systems and engine are returned to their normal operating modes. "Fuel shutoff" marks the point at which fuel flow to the engine is stopped. "Engine stopping" is the time period during which the engine speed decreases to 0. "Below fuel restart" marks the point after which if a restart is requested during the "engine stopping" stage, the starter may need to be engaged to crank the engine. If a restart is requested before "below fuel restart" and during the "engine stopping" stage, the engine may be restarted by turning the flow of fuel back on. "Engine speed=0" marks the point at which the engine speed is near or equal to 0.

"Engine auto-stopped" is the time period during which the engine is off. "Starter engage" marks the point at which the starter starts to crank the engine in an effort to start the engine in response to detecting an engine auto start condition. "Starter cranking engine" is the time period during which the engine is unable to crank under its own power. "Starter disengage" marks the point at which the engine is able to crank under its own power. "Engine speed increasing" is the time period during which the speed of the engine increases to its running speed (a speed at or above target idle speed). "Autostart end" marks the point at which the speed of the engine achieves its running speed.

Referring again to FIG. 1, the controllers 20 may first determine whether values of certain system parameters fall within specified ranges prior to initiating an auto stop of the engine 12 (prior to "Auto-stop being"). These system parameters may include battery voltage, battery state of charge, and electric current demand. Other system parameters such as maximum engine auto stop time, range of acceptable battery temperatures, etc., however, are also contemplated. As an example, the controllers 20 may determine if the battery voltage is greater than some predetermined threshold value. If not, the controllers 20 may not initiate an auto stop of the engine 12 as the vehicle 10 comes to a stop. Similarly, the controllers 20 may determine whether the electric current demand associated with the electrical load subsystems 18 is greater than some predetermined threshold value. If so, the controllers 20 may not initiate an auto stop of the engine 12 as the vehicle 10 comes to a stop, etc.

Stop/start events may cause wear of system components. A starter of a micro-hybrid vehicle, for example, may have a duty cycle that is greater than a starter of a conventionally powered vehicle. That is, a starter of a micro-hybrid vehicle may be activated a greater number of times over the life of the vehicle relative to a starter of a conventionally powered vehicle. A battery of a micro-hybrid vehicle, for example, may experience a greater number of charge/discharge cycles relative to a battery of a conventionally powered vehicle because the battery of the micro-hybrid vehicle may need to support electrical load subsystems during the "Engine auto stopped" stage. Hence, the above-mentioned specified ranges/threshold values may be selected with durability concerns in mind: the greater the battery voltage threshold value, the fewer number of stop/start events; the narrower the range of acceptable battery states of charge, the fewer number of stop/start events; and, the lesser the electric current demand threshold value, the fewer number of stop/start events.

Different drivers may drive the same vehicle differently because of personal preference and driving environment. Some drivers, for example, may drive primarily on city streets. Other drivers may drive primarily on highways. One may expect that, for the same number of miles driven, city driving would result in a greater number of stop/start events compared with highway driving. Initial (or default) threshold values for the system parameters may be selected so as to achieve a specified durability goal given an expected drive cycle. Durability objectives are typically set with an eye toward more rigorous usage rather than less. As a result, durability objectives for stop/start system components may be set, for example, with city driving in mind rather than highway driving. This methodology will result in threshold values for the system parameters that are tuned to permit a certain number of stop/start events for a given number of miles driven. A vehicle driven primarily on highways, however, may experience far fewer stop/start events than what it is designed to experience. Dynamically altering the threshold values to encourage stop/start events in these circumstances may promote increased fuel economy.

Figure 3:
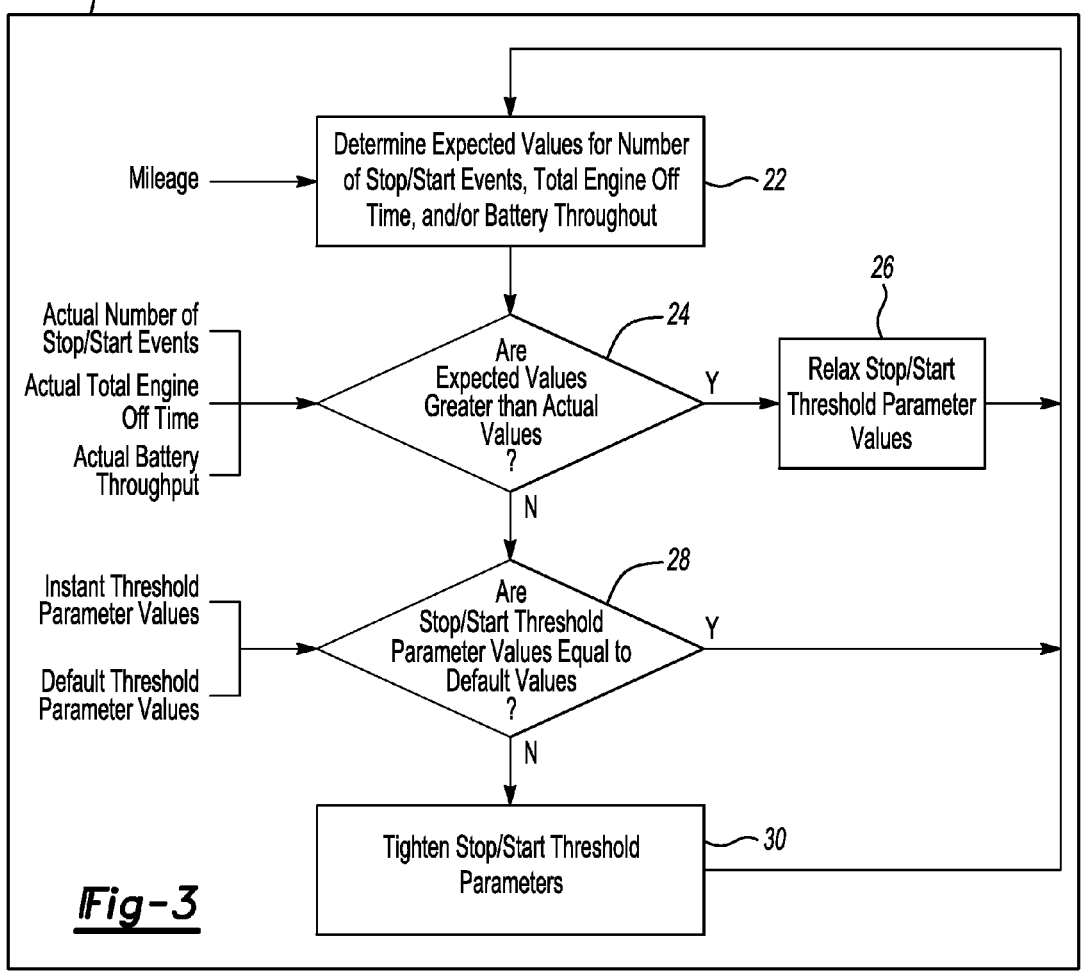
FIG. 3 is a flowchart depicting an algorithm for tuning stop/start threshold parameter values.

Referring to FIG. 3, the controllers 20 may track, for example, the total number of stop/start events, the total engine off time associated with these stop/start events, and/or the total battery throughput for a drive cycle using any suitable/known counting/tracking technology. For example, battery throughput may be measured in Amp-hours in or out of the battery 16. As mentioned above, the number of stop/start events represents wear on system components due to component cycling (e.g., the activation/deactivation of the engine starter). The engine off time and battery throughput represents wear on the battery 16 due to battery discharge/charge cycling caused by supporting the electrical load subsystems 18 during the "Engine auto stopped" stage.

At operation 22, the expected values for the number of stop/start events, the total engine off time, and/or the battery throughput may be determined. The controllers 20, for example, may inspect a look up table that maps expected values of these parameters with mileage (drive cycle mileage, vehicle mileage, etc.): for a mileage of X, a value of Y may be returned for the expected number of stop/start events and a value of Z may be returned for the expected total engine off time. In other examples, the mileage may be input to a function that calculates the expected number of stop/start events and/or a function that calculates the expected total engine off time, etc. Other scenarios are also possible.

At operation 24, it is determined whether the expected values are greater than the actual values. For example, the controllers 20 may compare the actual number of stop/start events with the expected number determined at operation 22; the controllers 20 may compare the actual total engine off time with the expected total engine off time determined at operation 22; the controllers 20 may compare the actual total battery throughput with the expected total battery throughput. If yes, the system parameter threshold values may be relaxed at operation 26 to encourage stop/start events (increase the frequency of engine auto stops), increase the amount of engine off time, and/or increase the battery throughput. As an example, the controllers 20 may incrementally decrease the battery voltage threshold value, widen the range of acceptable battery states of charge, and/or increase the electric current demand threshold value. Alternatively, the controllers 20 may use suitable/known learning techniques (e.g., neural networks, etc.) to estimate threshold values that will yield the desired number of stop/start events and or amount of engine off time. The algorithm then returns to operation 22.

Certain designs/arrangements may favor altering only one threshold parameter value. Other circumstances may favor altering all threshold parameter values. As an example, a modest difference between the expected number of stop/start events and actual number of stop/start events may require altering only one of the threshold parameter values. A substantial difference between the expected number of stop/start events and actual number of stop/start events may require altering all of the threshold parameter values. That is, stop/start system sensitivity may vary not only with the amount with which the threshold parameter values are changed but with how many threshold parameter values are changed. Hence, the determination as to which (and how many) of the threshold parameters are altered may depend on the difference obtained at operation 24. The decision as to which of the system threshold values and in what manner to alter these threshold values may be determined via testing, simulation, etc.

Returning to operation 24, if no, it is determined whether the system parameter threshold values are equal to their initial or default values. The controllers 20 may, for example, compare the instant threshold parameter values with the default values. If yes, the algorithm returns to operation 22. No changes are made to the threshold parameter values in this situation because doing so may alter the durability associated with certain stop/start system components. If no, the system parameter threshold values may be tightened at operation 30 to discourage stop/start events (decrease the frequency of engine auto stops), decrease the amount of engine off time, and/or decrease battery throughput. As an example, the controllers 20 may incrementally increase the battery voltage threshold value, narrow the range of acceptable battery states of charge, and/or decrease the electric current demand threshold value. The controllers 20 may instead use suitable/known learning techniques to estimate threshold values that will yield the desired number of stop/start events, amount of engine off time, and/or battery throughput. The algorithm then returns to operation 22.

The processes, methods, or algorithms disclosed herein may be deliverable to/implemented by a processing device, controller, or computer, which may include any existing programmable electronic control unit or dedicated electronic control unit. Similarly, the processes, methods, or algorithms may be stored as data and instructions executable by a controller or computer in many forms including, but not limited to, information permanently stored on non-writable storage media such as ROM devices and information alterably stored on writable storage media such as floppy disks, magnetic tapes, CDs, RAM devices, and other magnetic and optical media. The processes, methods, or algorithms may also be implemented in a software executable object. Alternatively, the algorithms may be embodied in whole or in part using suitable hardware components, such as Application Specific Integrated Circuits (ASICs), Field-Programmable Gate Arrays (FPGAs), state machines, or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes may be made without departing from the spirit and scope of the disclosure and claims. As previously described, the features of various embodiments may be combined to form further embodiments of the invention that may not be explicitly described or illustrated. While various embodiments may have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to: cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   a battery;
   an engine; and
   a controller configured to command the engine to auto stop during a drive cycle in accordance with auto stop criteria and to alter the auto stop criteria during the drive cycle based on a total auto stop off time of the engine during the drive cycle or a total throughput of the battery during the drive cycle to affect a frequency with which the engine is auto stopped.

2. The vehicle of claim 1 wherein the at least one controller is further configured to alter the auto stop criteria, in response to a number of previous auto stops of the engine being less than an expected number of previous auto stops of the engine, such that the frequency with which the engine is auto stopped increases.

3. The vehicle of claim 1 wherein the at least one controller is further configured to alter the auto stop criteria, in response to the total auto stop off time of the engine during the drive cycle being less than an expected total auto stop off time of the engine, such that the frequency with which the engine is auto stopped increases.

4. The vehicle of claim 1 wherein the at least one controller is further configured to alter the auto stop criteria, in response to the total throughput of the battery during the drive cycle being less than an expected total throughput of the battery, such that the frequency with which the engine is auto stopped increases.

5. The vehicle of claim 1 wherein the at least one controller is further configured to alter the auto stop criteria, in response to a number of previous auto stops of the engine being greater than an expected number of previous auto stops of the engine, such that the frequency with which the engine is auto stopped decreases.

6. The vehicle of claim 1 wherein the at least one controller is further configured to alter the auto stop criteria, in response to the total auto stop off time of the engine during the drive cycle being greater than an expected total auto stop off time of the engine, such that the frequency with which the engine is auto stopped decreases.

7. The vehicle of claim 1 wherein the at least one controller is further configured to alter the auto stop criteria, in response to the total throughput of the battery for the drive cycle being greater than an expected total throughput of the battery, such that the frequency with which the engine is auto stopped decreases.

8. The vehicle of claim 1 wherein altering the auto stop criteria includes altering a battery voltage threshold value, altering a range of acceptable battery states of charge, or altering an electric current demand threshold value.

9. A method for controlling an engine of a vehicle comprising:
tracking an auto stop off time of the engine for a drive cycle;
commanding the engine to auto stop in accordance with auto stop criteria; and
altering the auto stop criteria, in response to the auto stop off time being less than an expected auto stop off time for the drive cycle, such that a frequency with which the engine is auto stopped increases.

10. The method of claim 9 further comprising altering the auto stop criteria, in response to the auto stop off time being greater than the expected auto stop off time, such that the frequency with which the engine is auto stopped decreases.

11. The method of claim 9 wherein altering the auto stop criteria includes altering a battery voltage threshold value, altering a range of acceptable battery states of charge, or altering an electric current demand threshold value.

12. A method for controlling a vehicle engine comprising:
tracking a battery throughput for a drive cycle;
commanding the engine to auto stop during the drive cycle in accordance with auto stop criteria; and
altering the auto stop criteria during the drive cycle, in response to the battery throughput for the drive cycle being less than an expected throughput for the drive cycle, such that a frequency with which the engine is auto stopped increases.

13. The method of claim 12 further comprising altering the auto stop criteria during the drive cycle, in response to the battery throughput for the drive cycle being greater than the expected throughput for the drive cycle, such that the frequency with which the engine is auto stopped decreases.

14. The method of claim 12 wherein altering the auto stop criteria includes altering a battery voltage threshold value, altering a range of acceptable battery states of charge, or altering an electric current demand threshold value.

* * * * *